United States Patent Office 3,594,340
Patented July 20, 1971

3,594,340
EPOXY RESIN ESTERS AND PROCESS OF PREPARATION
Samuel D. Hollis, Pleasant Hills, Pa., and Philip E. Winston, Jr., Union, N.J., assignors to Pennsylvania Industrial Chemical Corporation
No Drawing. Filed June 24, 1968, Ser. No. 739,189
Int. Cl. C08g 30/10
U.S. Cl. 260—18EP                    11 Claims

ABSTRACT OF THE DISCLOSURE

Terpene epoxy resin ester solution which is non-photochemically reactive and a process for preparing such a solution by polymerizing a mixture of liquid epoxy resin and a terpene phenolic compound dissolved in a hydrocarbon solvent and thereafter esterifying the product with a monocarboxylic acid.

---

This invention relates to synthetic resinous compositions known as epoxy resin esters and a process for the preparation thereof. These esters have become well established for use in high performance coatings such as industrial maintenance enamels, can coatings, and wear resistant coatings for wood and concrete and the like.

The term "epoxy resin esters" has become well known to describe the reaction product of a monocarboxylic acid with epoxy resin. The monocarboxylic acids (sometimes called fatty acids) are usually the siccative type derived from the vegetable oils, tall oil, soya bean oil, linseed oil, dehydrated castor oil, tung oil and the like. The best known type of epoxy resin is that produced by the reaction of diglycidyl ether of bisphenol A with bisphenol A. Bisphenol A may also be named 2,2-di-(p-hydroxyphenyl) propane.

Epoxy resin esters are dissolved in a solvent or, most often, a mixture of solvents, for use in coatings. The most important indicia of performance of these esters in coatings are their chemical resistance, adhesion and fast dry time. These properties are influenced by the type of monocarboxylic acid used to form the ester. The monocarboxylic acid must promote drying during the formation of a film of the epoxy resin ester and accordingly is commonly referred to as a "drying oil." The tendency of an oil to air dry is directly related to its fatty acid components.

The degree of chemical resistance exhibited by an epoxy resin ester coating decreases as the concentration of monocarboxylic acid used in the esterification reaction is increased. It has been found that the desired degree of chemical resistance and drying time is not achieved when more than an equal part of drying oil is reacted with epoxy resin in the formation of the ester.

The formulation of epoxy resin esters having superior chemical resistance and short drying time requires, therefore, that the concentration of drying oil used as a reactant be optimized; that is, be in the range of about 40 to 50 percent of the total non-volatile solids in the coating. It is well known that epoxy resin esters prepared in this manner must be carried in strong solvents which are odorous, toxic and costly. The most common components of these strong solvents are the substituted aromatic compounds characterized by the benzene ring configuration with one or more substituents on the benzene ring.

Substituted aromatics are photochemically reactive; that is, they respond to ultra-violet light and air and thereby emit irritating organic compounds to the atmosphere. Emission of these compounds has been shown to be detrimental to the health of mankind and has been the subject of extensive legislation limiting the quantity of photochemically reactive substances which may be used in coating solvents. Legislation of this kind has taken various courses but, in general, a photochemically reactive solvent may be taken as any solvent with an aggregate of more than about 20 percent of its total volume composed of the chemical compounds classified below or which exceeds any of the following individual percentage composition limitations, referred to the total volume of solvent:

(1) A combination of hydrocarbons, alcohols, aldehydes, esters, ethers or ketones, having an olefinic or cycloolefinic type of unsaturation: 5 percent;

(2) A combination of aromatic compounds with eight or more carbon atoms to the molecule except ethylbenzene: 8 percent;

(3) A combination of ethylbenzene, ketones having branched hydrocarbon structures, trichloroethylene or toluene: 20 percent.

Conversely, a solvent which does not fall within the foregoing definition may be taken as a non-photochemically reactive solvent.

Heretofore, epoxy resin esters were prepared by reacting a hard epoxy resin polymer, illustrated by the formula:

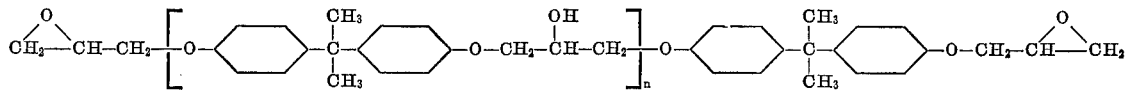

wherein $n$ has a value between about 4 and 10, with the monocarboxylic acids previously described. The reaction product was then dissolved in a mixture of solvents so that the polymer could be handled and applied as a liquid solution. However, there are important disadvantages and limitations to this process.

In the prevailing method of manufacture, these hard resins are more difficult to prepare than the liquid monomers or low polymers in which $n$ has a value from about 1 to about 4 owing to the greater difficulty of removing salts from the higher molecular weight products. Definite economic and performance advantages would accrue if liquid epoxy resin (by which we mean epoxy resin polymer of the above formula wherein $n$ has a value from about 1 to about 4) could simply be copolymerized with the bisphenol A or other usable dihydroxy compound in the very equipment in which the final epoxy resin ester is to be produced, and then having prepared precisely that molecular weight polymer desired in situ, proceed in the normal way to esterify this polymer and then dilute it with appropriate solvents. This procedure has not been followed because the reaction between the liquid epoxy resins which are commercially available and diphenolic compound, usually bisphenol A, is very rapid, exothermic and produces polymers which may thermoset or which may gell in the later stage of esterification or which at best cannot be reproduced from one batch to the next so that the performance and physical characteristic of any given batch of finished epoxy resin ester cannot be reliably controlled or predicted.

We will now describe a new process whereby the problems of using the liquid epoxy resins are solved and terpene epoxy resin esters equal to or superior to those produced from the hard epoxy resin may be prepared under conditions wherein very precise control of the epoxy resin polymerization is possible.

Moreover, the novel composition of terpene epoxy resin ester produced by the process can be carried in solvent mixtures comprised of 95% by weight or more of non-photochemically reactive hydrocarbon mixtures, yet retains all the advantages of chemical resistance and short dry time. Prior to our invention, epoxy resin esters having these performance properties could not be carried in such a solvent.

We provide a process for preparing a terpene epoxy resin ester comprising the steps of reacting a mixture of liquid epoxy resin consisting essentially of diglycidyl ether of bisphenol A and a terpene phenolic compound dissolved in at least one saturated hydrocarbon solvent in the presence of a catalyst to form a copolymer and thereafter esterifying at least a portion of the hydroxyl groups of said copolymer with a monocarboxylic acid.

Preferably, the process is carried out by admixing liquid epoxy resin with a terpene phenolic compound to form a reaction mixture. We prefer to employ a liquid epoxy resin comprising an epoxy resin polymer of the formula:

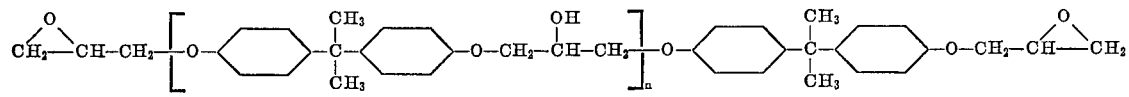

wherein $n$ has a value from about 1 to about 4. We further prefer to employ a terpene phenolic compound (described in detail below) comprising the reaction product of not more than 63% by weight of cyclic terpene selected from the group consisting of alpha-pinene, beta-pinene, dipentene, $\Delta^3$ carene and turpentine with phenol.

The reaction mixture is dissolved in at last one saturated hydrocarbon solvent, preferably having 9 to 12 carbon atoms per molecule inclusive. We prefer to utilize a hydrocarbon solvent at a concentration of about 5% to about 30% by weight. In its preferred form, the invention is carried out by dissolving the reaction mixture in a non-photochemically reactive solvent system which comprises at least one saturated hydrocarbon solvent of the type and in the concentration range described above. By specifying the range of carbon atoms present in the hydrocarbon molecule, a solvent having an initial boiling point greater than 300° F. is assured.

We provide that the catalyst used in the process of the invention comprises a salt of a metal selected from Group I-A and Group II-A of the Periodic Table of Elements, preferably lithium naphthenate at a concentration wherein about 0.002 to about 0.005% of the reaction mixture is lithium metal.

In the process of our invention, the monomeric constituents of the reaction mixture formed by the admixing of liquid epoxy resin an a terpene phenolic compound are polymerized in the presence of the catalyst to form a copolymer in the hydrocarbon solvent system. We prefer to carry out the polymerization at a temperature of at least 350° F. and preferably between 350° F. and about 550° F. We provide that at least a portion of the hydroxyl groups of the copolymer produced by the polymerization are esterified with no more than an equal part by weight of a monocarboxylic acid in the hydrocarbon solvent system. We further prefer to provide that the monocarboxylic acid is selected from the group consisting of coconut fatty acid, cottonseed fatty acid, dehydrated castor oil fatty acid, soya fatty acid, linseed oil fatty acid and tall oil fatty acid. We further prefer to provide that the esterification step be carried out until an acid number of less than 15 is reached.

We further provide that a non-photochemically reactive terpene epoxy resin ester solution is prepared by adding at least one appropriate solvent to the ester produced by the foregoing process.

We further provide a terpene epoxy resin ester characterized by its solubility in a non-photochemically reactive solvent system consisting essentially of (A) 50 to 60% by weight of a copolymer of a terpene phenolic compound and liquid epoxy resin consisting essentially of diglycidyl ether of bisphenol A, said copolymer having been produced by reacting said terpene phenolic compound in the range of 40 to 55% by weight with said liquid epoxy resin in the range of 45 to 60% by weight; and (B) 40 to 50% by weight of a monocarboxylic acid.

In the practice of our invention, we prefer to use terpene phenolic compounds characterized by their high phenol reactivity as one of the starting materials. These terpene phenolic comounds may be prepared according to the process described in our co-pending application, U.S. Ser. No. 739,179 or by any other convenient process.

The cyclic terpene constituent of the terpene phenolic compound should not exceed 63% by weight. Otherwise, the copolymerization reaction between the liquid epoxy resin and the terpene phenolic compound will not occur completely; that is, there will be unreacted terpene phenolic compound remaining which interferes with subsequent procssing. We elect to use the terpene phenolic compounds to replace or partially replace the bisphenol A or other bisphenol as a source for the reactive hydroxy groups required so that the polymer which results when these hydroxy bearing compounds react acquires sufficient solubility in hydrocarbon solvents so that the copolymerization reaction may be carried out in solution in these solvents. Hydrocarbon solvents have a profound effect on moderating the copolymerization reaction so that instead of going to completion in a short time, it may be delayed so as to proceed smoothly over a period of up to 8 hours or longer, if desired.

We have discovered that these terpne phenolic compounds promote solubility of the polymer in saturated aliphatic hydrocarbons. These are well known for their low odor, low cost and freedom from photochemical reactivity. The tolerance of the completed terpene epoxy ester for aliphatic solvents is such that it permits the use of 100% hydrocarbon solvents even in non-photochemical reactive formulations.

Strong solvents such as ketones need not be used at all or may be restricted to low levels not exceeding 8 percent of the solvent mixture by weight. Ketones are disadvantageous because they are corrosive to materials which are not attacked by hydrocarbon solvents; for example, can linings, hoses used in spray equipment, etc.

When used in sufficient amounts in the epoxy resin polymerization step, these terpene phenolic compounds produce epoxy esters which have solubility requirements such that even when low concentrations of monocarboxylic acid are used, the hydrocarbon solvents which were present to moderate polymerization may be retained in the kettle throughout the entire esterification step and may be retained as part of the final solvent composition of the completed epoxy ester solution where they serve to improve application characteristics. It is important that the terpene phenolic compounds be free of alkaline metal salts such as salts of sodium, potassium, lithium, calcium and also amine salts, since even small amounts of such salts can be deleterious for reasons stated hereinafter.

According to the present invention, liquid epoxy resin consisting primarily of the diglycidyl ether of bisphenol A is heated to a temperature of 250 to 300° F. and agitated while crushed terpene phenolic compound is stirred in. Agitation is continued until the terpene phenolic compound is completely dissolved. No reaction will occur because no catalysts are present to cause these materials to react at this point unless the terpene phenolic compound contains catalytic amounts of potassium, sodium, or the like as discussed above. The resultant blend may contain from 40% to 55% terpene phenolic compound. This molten mass is then diluted with 5% to 30% hydrocarbon solvent which has an initial boiling point high enough so that it will not distill out at the required minimum batch temperature of 350° F. The hydrocarbon solvent may meet the requirements of non-photochemical reactivity as described above. The order and mode of mixing the starting materials to form the reaction mixture are not critical and may be otherwise performed.

Sufficient lithium naphthenate is added to give about 0.002–0.005% Li metal based on epoxy resin and terpene phenolic compound present. The reaction is then maintained at a minimum temperature of 350° F. while the viscosity of the batch steadily increases. The progress of this reaction may be followed by withdrawing small samples from the batch, diluting them to some convenient solids content with a solvent such as methyl isobutyl ketone or ethylene glycol mono-n-butyl ether and measuring the viscosity. In turn the viscosity value will be a measure of the average molecular weight of the polymer.

When the predetermined average molecular weight of the epoxy resin has been attained, a monocarboxylic acid such as soya, tall oil, dehydrated castor oil fatty acids and the like are added to esterify this epoxy resin. Following esterification the epoxy ester is thinned to the desired viscosity and solids content with suitable non-photochemically reactive solvents as required to obtain the application characteristics needed. The aliphatic solvents used to moderate the polymerization of the epoxy ester are retained as part of the final solvents used.

The polymerization of the epoxy resin, prior to addition of the monocarboxylic acid must not be carried too far, otherwise the reaction may gell during the later esterification step. The optimum average molecular weight of the epoxy resin which may be monitored by solution viscosity in the manner described, is peculiar to the amount of terpene phenolic compound used and the amount and type of monocarboxylic acid selected for use in the esterification step. This molecular weight is subject to close control through the practice of our invention.

Ratios of liquid epoxy resin and terpene phenolic compound such as 60% epoxy resin, 40% terpene phenolic compound may be used and controlled even though this combination would quickly gell if it were attempted without solvent moderation. The examples which follow serve to illustrate the preparation of epoxy resin ester wherein we have determined certain desirable epoxy resin polymer molecular weights to produce finished esters comparable to those commercially available.

The novel terpene epoxy resin ester produced by the process detailed above consists essentially of a copolymer of a terpene phenolic compound and liquid epoxy resin in the range of 50 to 60% by weight and a monocarboxylic acid in the range of 40 to 50% by weight. It is believed that the concentration of monocarboxylic acid in the product is the limiting constituent in obtaining the desired properties in the ester. If the concentration of monocarboxylic acid is less than 40% by weight, the epoxy ester does not have the required flexibility; whereas, if the concentration of monocarboxylic acid in the final ester exceeds 50% by weight, the chemical resistance of the ester is substantially decreased.

There are observed limitations in the preparation of the copolymer of the terpene phenolic compound and liquid epoxy resin, principally with respect to concentration of the terpene phenolic compound utilized. When the concentration of the terpene phenolic compound is less than 40% by weight, low molecular weight copolymers are formed which are not useful in preparing an epoxy ester with the properties desired in our invention. If the concentration of terpene phenolic compound exceeds 55% by weight, an excessive number of hydroxyl groups of the liquid epoxy resin will be consumed. Subsequently, any attempt to esterify the copolymer of the terpene phenolic compound and the liquid epoxy resin will be possible only through the use of very low concentrations of drying oil.

The terpene epoxy resin ester produced by the combination of ingredients described above is soluble in a non-photochemically reactive solvent system consisting entirely of hydrocarbon solvents. Heretofore, epoxy esters having the high degree of chemical resistance exhibited by the product of our invention have not been soluble in such solvent systems. This represents a material advantage in view of the low cost of hydrocarbon solvents. The ester produced in accordance with the present invention also may be dissolved in suitable organic solvents or emulsified by well known techniques and thereafter applied in a liquid condition. The ester of the present invention may also find application in cements, coatings, adhesives and the like.

Considerable variation in selection of raw materials and process conditions are possible while utilizing the process and practice of this invention. Thus the terpene phenolic compound may be used as a partial replacement for bisphenol A or other dihydric phenol or alcohol in the preparation of the liquid epoxy resin where these dihydric phenols or alcohols are reacted with epichlorohydrin, or the terpene phenolic compound may be used as a complete or partial replacement of the bisphenol A or other dihydric phenol or alcohol where these materials are reacted with the liquid epoxy resin in this case using the solvent of the type we have described to moderate the reaction. Which of these two approaches are used or if a combination of these two approaches are used, does not affect the function of the terpene phenol compound we have described.

We believe that the terpene phenolic compound utilized as a starting material in our invention can be copolymerized with diglycidyl ether other than diglycidyl ether of bisphenol A to produce copolymers which will have enhanced solubility in hydrocarbon solvents. In addition, these copolymers may be reacted with acids or amines to produce reaction products which themselves will have enhanced solubility in hydrocarbon solvents.

The following examples will serve to illustrate the practice of our invention. The examples are not intended to limit the invention, however, for there are numerous possible variations and modifications.

EXAMPLE 1

775 g. of liquid diglycidyl ether of 2,2-di(p-hydroxy phenol) propane were heated to 300° F. and 775 g. of powdered terpene phenolic compound (prepared from alpha-pinene) of the type described hereinabove and having a ring and ball softening point of 216° F. were added while continuing agitation until all of the terpene phenolic compound was smoothly dissolved. The reaction vessel was purged with $N_2$ gas and 170 g. of high boiling petroleum solvent were added. This solvent, known by the tradename "Valco 382" was supplied by Ashland Oil and Refining Co. and as the following characteristics:

| | |
|---|---|
| Origin | Petroleum |
| Specific gravity at 60° F. | 0.8040 |
| Kauri-butanol value (ASTM test method D–1133) | 37.1 |
| Aniline point ° C. (ASTM test method D–1012) | 59 |

Composition (volume percent):

| | |
|---|---|
| Paraffins | 18.9 |
| Olefins | 0.9 |
| Naphthenes | 68.9 |
| Aromatics | 11.3 |
| | 100.0 |

Distillation ° F. (ASTM test method D–86) (ASTM test method D–1087):

| | |
|---|---|
| Initial boiling point | 368 |
| 50% | 375 |
| Dry point | 386 |
| End point | 390 |

The batch temperature was then adjusted to 400° F. while maintaining good agitation. Lithium naphthenate solution was added to obtain 0.004% Li metal on total charge and the batch held for 20 minutes when 1040 g. of dehydrated castor oil fatty acids were added (Bakers 9–11 acids supplied by Baker Castor Oil Co.). The batch was heated to 500° F., withdrawing solvent from a condenser trap as needed to attain this temperature and held for 3½ hours at 500° F. during which time about 20 ml. of water was collected in a condenser trap and withdrawn. The batch was then cooled to 400° F. and thinned with Valco 382 (including any solvent withdrawn from the condenser trap) followed by hexane and methyl ethyl ketone in that order so as to obtain a terpene epoxy ester solution having the following composition and characteristics:

| | Percent |
|---|---|
| Epoxy ester solids | 50.00 |
| Valco 382 | 21.40 |
| Hexane | 25.35 |
| Methyl ethyl ketone | 3.25 |
| | 100.00 |

Cobalt naphthenate was added to this solution so as to provide 0.04% Co on total solids and the solution permitted to age one day. When tin plate was coated with this solution so as to deposit a dry coating of one mil thickness it exhibited the properties of a high performance epoxy ester coating as shown by the following data:

| | | |
|---|---|---|
| Dry time (tack free) | Air dry 3 hrs | Bake 30 min. at 200° F. |
| Film age | 5 days | |
| VM&P naphtha (spot test): | | |
| 1 hour | Softens, recovers | Unaffected. |
| 9 hours | do | Do. |
| 30% NaOH (spot test): | | |
| 8 hours | Unaffected | Do. |
| 24 hours | do | Do. |
| Boiling water immersion: | | |
| 8 hours | do | Do. |
| 17 hours | Blush, recovers | Do. |
| ⅛ inch mandrel bend | Pass | Pass. |

EXAMPLE 2

420 g. of liquid diglycidyl ether of 2,2-di(p-hydroxyphenol) propane, 280 g. of powdered terpene phenol compound (prepared from alpha-pinene) of the type described above and having a ring and ball softening point of 216° F. were mixed with 72 g. of mineral spirits (37 kauri-butanol, 300 to 400° F. distillation range). The slurry was agitated and heated to 365° F. under inert gas and sufficient lithium naphthenate solution was added to give a concentration of 0.004% Li in the batch. The polymerization of the batch was monitored by observing the increase in solution viscosity utilizing the following procedure: One volume of sample withdrawn from batch was added to approximately ½ volume of preweighed cold ethylene glycol mono-n-butyl ether which was quickly stirred, weighed and diluted further with this glycol butyl ether so as to contain 40% solids content. The viscosity of this sample was determined at 25° C. using Gardner-Holdt tubes although other faster or more accurate devices have also been used to measure viscosity. After five hours at 365° F., when the cook had reached a viscosity of S to T Gardner as determined by the method described, 465 g. of distilled soya fatty acids were added and the batch heated to 485° F. while withdrawing solvent from the condenser trap as required to attain this temperature. After two hours at this temperature, the batch was cooled and thinned with mineral spirits (including any withdrawn from the condenser trap) followed by hexane so as to obtain a terpene epoxy ester solution having the following composition and characteristics:

| | |
|---|---|
| Epoxy ester solids, percent | 50.00 |
| Mineral spirits, percent | 21.40 |
| Hexane, percent | 28.60 |
| | 100.00 |

| | |
|---|---|
| Color (Gardner) | 8 |
| Viscosity (Gardner-Holdt) | Z–6 |
| Acid number/solids mg. KOH/g | 4 |

Cobalt naphthenate was added to this solution so as to provide 0.04% Co on total solids and the solution permitted to age one day. When tin plate was coated with this solution using a Bradley knife so as to deposit a one mil dry film, the coating dryed tack free in 1½ hours. It was, however, evaluated as a baked coating and it exhibited the properties of a high performance epoxy ester coating as shown by the following data:

Pass ⅛" mandrel bend.

| | |
|---|---|
| Bake schedule | 30 min at 275° F. |
| Flexibility | Pass ⅛" mandrel bend. |
| Impact resistance, 50 inch-lb. direct | Pass. |
| 30% NaOH Spot Test | 24 hrs. unaffected. |
| Boiling water immersion | 8 hrs. unaffected. |
| VM&P naphtha immersion: | |
| One hour | Unaffected. |
| 24 hours | Softens—recovers. |
| Distilled water immersion | 24 hrs. unaffected. |
| Mar resistance | Excellent. |

This example, illustrates the technique of advancing the copolymer of the terpene phenolic compound with the diglycidyl ether to high molecular weight thus obtaining fast air dry and good bake properties with the less expensive soya fatty acids. The solvent system was 100% hydrocarbon, non-photochemically reactive.

EXAMPLE 3A 4.5 g. of a 10% solution of $BF_3$ in phenol were added to 162 g. of molten phenol in a vessel equipped with a powerful agitator and water cooling. Alpha-pinene was added at a steady rate of approximately 3.5 ml./min. so as to permit the complete addition of 367 g. in two hours. The temperature was maintained at 55° C.±2° C. for the first ¼ of alpha-pinene addition, then allowed to exotherm to 90° C. and controlled at this temperature while the remainder of the alpha-pinene was added. The batch was maintained at 90° C. for one hour; then an additional 4.5 ml. of 10% $BF_3$ in phenol was added followed by 135 g. additional phenol and externally heated to 150° C. Light vacuum was then applied to begin distillation of excess phenol and $BF_3$ gas. The temperature was taken to 240° C. at 100 mm. Hg then product was cooled to 150° C. under inert gas and poured into pans.

539 g. of phenolic compound was produced having a softening point of 79° C.

EXAMPLE 3B 101 g. of the terpene phenolic compound of example 3A and 83 g. of liquid diglycidyl ether of 2,2-di(p-hydroxyphenol) propane plus 10 g. of mineral spirits of Example 2 were heated to 260° F. with agitation in a vessel purged with $N_2$ gas when 1.0 g. of 1.0% lithium naphthenate was added. The batch was heated to 400° F. and held at this temperature until a viscosity of Gardner G was obtained as determined in Example 2 (about 3 hours hold at 400° F.). 120 g. of Bakers 9–11 fatty acids were added, the temperature raised to 485° F. and sufficient mineral spirits added so as to obtain heavy reflux. Water which evolved from the reaction was collected and removed from a condenser trap. After five hours at 485° F., the batch was cooled and thinned to 50% of non-volatile solids with mineral spirits. Good agitation was provided throughout the entire process. The terpene epoxy ester solution thus produced had the following composition and characteristics:

| | |
|---|---|
| Epoxy ester solids, percent | 50.0 |
| Mineral spirits, percent | 50.0 |
| | 100.0 |
| Viscosity (Gardner-Holdt) | X–Y |
| Color (Gardner) | 8 |
| Acid number/solids mg. KOH/g | 9 |

EXAMPLE 3C

A white enamel was prepared as follows:

| | G. |
|---|---|
| (1) Rutile titanium dioxide pigment | 300.0 |
| (2) Epoxy ester of Example 3B | 71.0 |
| (3) Mineral spirits (37 K.B.) | 49.0 |

Ground on three roll mill to 7+ on Hegman Grind Gage then mixed with:

| | |
|---|---|
| (4) Epoxy ester of Example 3B | 296.0 |
| (5) Mineral spirits (37 K.B.) | 91.0 |
| (6) Cobalt naphthenate (6% Co) | 3.3 |
| Total | 810.3 |

Performance and characteristics

| | |
|---|---|
| Dry time (2 mil wet film) | 4 hrs. |
| Gloss 60° | 96 percent. |
| Pigment volume concentration in solids | 29 percent. |
| Non vol. solids | 60 percent. |
| Flexibility (2 week old film) | Pass 1/8", mandrel bend. |
| Chemical resistance: | |
| 30% NaOH solution 8 hrs. | Darkens slightly, film unaffected. |
| Boiling water 8 hrs. | Do. |
| VM&P naphtha immersion one hour | Unaffected. |

This example illustrates the fact that only minor amounts of the expensive diglycidyl ether need be used in preparing the epoxy ester with terpene phenolic compound. This epoxy ester exhibited good pigment wetting as indicated by the high gloss obtained in the enamel.

EXAMPLE 4

Following the procedure of Example 2, a terpene phenolic compound (prepared from beta-pinene) of the type described above and having a ring and ball softening point of 232° F. was copolymerized 2,2-di(p-hydroxyphenol) propane to a solution viscosity of S as determined in Example 2 then esterified with distilled soya fatty acid and thinned with a mixture of mineral spirits (37 K.B.) and hexane. The resultant solution was non-photochemically reactive. The performance of this epoxy ester when evaluated as a coating on metal was essentially equal to that of the epoxy ester of Example 2 which had been prepared from a copolymer utilizing alpha-pinene.

While we have described a present preferred product and a present preferred method of preparing the same, it is to be distinctly understood that the invention is not limited thereto but may be otherwise variously practiced within the scope of the following claims.

We claim:
1. A process for preparing a terpene epoxy resin ester comprising the steps of reacting a mixture of liquid epoxy resin consisting essentially of diglycidyl ether of 2,2-di(p-hydroxyphenyl) propane and a terpene phenolic compound dissolved in an aliphatic hydrocarbon solvent system in the presence of a catalyst to form a copolymer, said terpene phenolic compound comprising the reaction product of not more than 63% by weight of a cyclic terpene selected from the group consisting of alpha pinene, beta pinene, dipentene, $\Delta^3$ carene and turpentine with phenol; and thereafter esterifying at least a portion of the hydroxyl groups of said copolymer with a monocarboxylic acid.

2. A process for preparing a terpene epoxy resin ester comprising the steps of
(A) admixing liquid epoxy resin consisting essentially of diglycidyl ether of 2,2 di(p-hydroxyphenyl) propane with a terpene phenolic compound to form a reaction mixture, said terpene phenolic compound comprising the reaction product of not more than 63% by weight of a cyclic terpene selected from the group consisting of alpha pinene, beta, pinene, dipentene, $\Delta^3$ carene and turpentine with phenol;
(B) dissolving the reaction mixture in an aliphatic hydrocarbon solvent system;
(C) polymerizing the monomeric constituents of the reaction mixture in the presence of a catalyst to form a copolymer in said aliphatic hydrocarbon solvent system; and
(D) esterifying at least a portion of the hydroxyl groups of the copolymer produced in step (C) with a monocarboxylic acid in said aliphatic hydrocarbon solvent system.

3. A process as recited in claim 2 in which the liquid epoxy resin comprises an epoxy resin polymer of the formula:

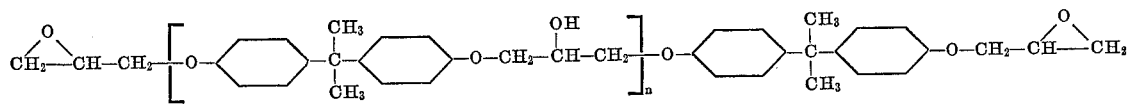

wherein $n$ has a value from 1 to about 4.

4. A process as recited in claim 2 in which step (C) is carried out at a temperature of at least 350° F.

5. A process as recited in claim 2 in which the monocarboxylic acid is selected from the group consisting of coconut fatty acid, cotton seed fatty acid, dehydrated castor oil fatty acid, soya fatty acid, linseed oil fatty acid and tall oil fatty acid.

6. A process for preparing a terpene epoxy resin ester solution comprising the steps of
   (A) reacting a mixture of liquid epoxy resin consisting essentially of diglycidyl ether of 2,2-di(p-hydroxyphenyl) propane and a terpene phenolic compound dissolved in an aliphatic hydrocarbon solvent system in the presence of a catalyst to form a copolymer, said terpene phenolic compound comprising the reaction product of not more than 63% by weight of a cyclic terpene selected from the group consisting of alpha pinene, beta pinene, dipentene, $\Delta^3$ carene and turpentine with phenol;
   (B) esterifying at least a portion of the hydroxyl groups of said copolymer with a monocarboxylic acid in said aliphatic hydrocarbon solvent system; and
   (C) adding at least one solvent to the product of step (B).

7. A process for preparing a non-photochemically reactive terpene epoxy resin ester solution comprising the steps of
   (A) reacting a mixture of liquid epoxy resin consisting essentially of diglycidyl ether of 2,2-di(p-hydroxyphenyl) propane and a terpene phenolic compound dissolved in an aliphatic hydrocarbon solvent system in the presence of a catalyst to form a copolymer, said terpene phenolic compound comprising the reaction product of not more than 63% by weight of a cyclic terpene selected from the group consisting of alpha pinene, beta pinene, dipentene, $\Delta^3$ carene and turpentine with phenol;
   (B) esterifying at least a portion of the hydroxyl groups of said copolymer with a monocarboxylic acid in said aliphatic hydrocarbon solvent system; and
   (C) adding at least one solvent to the product of step (B) to form a solution which is non-photochemically reactive.

8. A process as recited in claim 7 in which the aliphatic hydrocarbon solvent system comprises at least one saturated hydrocarbon solvent having 9 to 12 carbon atoms per molecule inclusive.

9. A process as recited in claim 8 in which the reaction of step (B) is carried out until an acid number of less than 15 is reached.

10. A terpene epoxy resin ester, characterized by its solubility in a non-photochemically reactive solvent system, consisting essentially of
    (A) 50 to 60% by weight of a copolymer of a terpene phenolic compound and liquid epoxy resin consisting essentially of diglycidyl ether of 2,2-di(p-hydroxyphenyl) propane, said copolymer having been produced by reacting said terpene phenolic compound in the range of 40 to 55% by weight with said liquid epoxy resin in the range of 45 to 60% by weight, said terpene phenolic compound comprising the reaction product of not more than 63% by weight of a cyclic terpene selected from the group consisting of alpha pinene, beta pinene, dipentene, $\Delta^3$ carene and turpentine with phenol; and
    (B) 40 to 50% by weight of a monocarboxylic acid.

11. A terpene epoxy resin ester, characterized by its solubility in an aliphatic hydrocarbon solvent system, consisting essentially of
    (A) 50 to 60% by weight of a copolymer of
       (i) 40 to 55% by weight of a terpene phenolic compound comprising the reaction product of not more than 63% by weight of a cyclic terpene selected from the group consisting of alpha pinene, beta pinene, dipentene, $\Delta^3$ carene and turpentine with phenol, and
       (ii) 45 to 60% by weight of a liquid epoxy resin consisting essentially of diglycidyl ether of 2,2-di(p-hydroxyphenyl) propane; and
    (B) 40 to 50% by weight of a monocarboxylic acid.

References Cited

UNITED STATES PATENTS

| | | | |
|---|---|---|---|
| 3,477,990 | 11/1969 | Dante | 260—47 |
| 2,592,560 | 4/1952 | Greenlee | 260—47 |
| 3,413,248 | 11/1968 | Kraft et al. | 260—18 |
| 3,378,525 | 4/1968 | Sellers | 260—348 |
| 3,336,257 | 8/1967 | Alvey | 260—18X |
| 3,294,865 | 12/1966 | Price | 260—18X |
| 3,271,363 | 9/1966 | Nikles | 260—18X |
| 3,247,136 | 4/1966 | Wynstra et al. | 260—18 |
| 3,057,928 | 10/1962 | Koblitz | 260—47X |
| 2,811,564 | 10/1957 | Bader | 260—47X |

OTHER REFERENCES

Handbook of Epoxy Resins, Lee & Neville, McGraw-Hill, New York (1967), p. 13–1.

"Epon Resins for Surface Coatings," Technical Publication SC: 52–31, Shell Chemical Corporation; p. 18.

DONALD E. CZAJA, Primary Examiner

C. W. IVY, Assistant Examiner

U.S. Cl. X.R.
260—33.6 ep, 47 ep